US006059277A

United States Patent [19]

Sawdon et al.

[11] Patent Number: 6,059,277

[45] Date of Patent: May 9, 2000

[54] RETRACTING POWER CLAMP

[75] Inventors: Edwin G. Sawdon, St. Clair; Steven J. Sprotberry, Marysville, both of Mich.

[73] Assignee: BTM Corporation, Marysville, Mich.

[21] Appl. No.: 09/072,629

[22] Filed: May 5, 1998

[51] Int. Cl.$^7$ .......... B23Q 3/08

[52] U.S. Cl. .......... 269/24; 269/32; 269/27

[58] Field of Search .......... 269/32, 271, 24, 269/27, 91, 93, 94

[56] References Cited

U.S. PATENT DOCUMENTS

| | | | |
|---|---|---|---|
| 1,048,100 | 12/1912 | Rorig | 269/271 |
| 1,667,616 | 4/1928 | Wright et al. . | |
| 1,736,171 | 11/1929 | Powell . | |
| 2,381,999 | 8/1945 | Bonnafe . | |
| 2,577,029 | 12/1951 | Moorhead | 269/271 |
| 3,058,214 | 10/1962 | Mekler . | |
| 3,273,878 | 9/1966 | Blatt . | |
| 3,341,190 | 9/1967 | Adamson | 269/271 |
| 3,362,703 | 1/1968 | Blatt | 269/32 |
| 3,371,923 | 3/1968 | Blatt | 269/32 |
| 3,381,954 | 5/1968 | Blatt | 269/32 |
| 3,545,050 | 12/1970 | Blatt et al. . | |
| 3,618,931 | 11/1971 | Blatt . | |
| 3,702,185 | 11/1972 | Blatt . | |
| 4,240,620 | 12/1980 | Tunkers . | |
| 4,396,183 | 8/1983 | Lymburner . | |
| 4,445,676 | 5/1984 | Tunkers . | |
| 4,494,739 | 1/1985 | Valentine . | |
| 4,496,138 | 1/1985 | Blatt . | |
| 4,591,138 | 5/1986 | Baills et al. . | |
| 4,637,597 | 1/1987 | McPherson et al. . | |
| 4,905,973 | 3/1990 | Blatt . | |
| 5,165,670 | 11/1992 | Sawdon | 269/32 |
| 5,171,001 | 12/1992 | Sawdon . | |
| 5,190,334 | 3/1993 | Sawdon . | |
| 5,516,173 | 5/1996 | Sawdon . | |
| 5,647,625 | 7/1997 | Sawdon | 269/86.4 |

OTHER PUBLICATIONS

BTM "Grippers for High Speed Part Transfer in Press" Brochure, 8 pages, prior to May 5, 1998.

BTM "Locking Grippers" Booklet, 27 pages, prior to May 5, 1998.

BTM "Retracting Power Clamp" 1500 Series, 2 pages, prior to May 5, 1998.

BTM "Omni–Head Mini–Power Clamps", 4 pages, prior to May 5, 1998.

BTM "Thin Power Clamps", 2500–2000–390 Series, 1500–1000–140 Series, 8 pages, Prior to May 5, 1998.

BTM "STC 50 Series Sealed Toggle Clamp–Blade Mount", 1 page, prior to May 5, 1998.

Vlier, Design Tips about Checknuts, about Detents and About the Nylon Locking Element, Vlier Selection Tips Standard Plungers and Stubby Plungers, 3 pages, prior to May 5, 1998.

DE–STA–CO Modell 8005–7F brochure, 2 pages, published prior to May 5, 1998.

Tunkers GmbH PKS 50 U brochure, 1 page (believed to have been published Jul. 1995).

*Primary Examiner*—David A. Scherbel
*Assistant Examiner*—Lee Wilson
*Attorney, Agent, or Firm*—Harness, Dickey & Pierce, P.L.C.

[57] ABSTRACT

A retracting power clamp includes a body having a generally cylindrical external surface. A clamping arm is movable from a retracted position to a clamping position with the arm being linearly extendable and pivotable relative to the body when moved between the retracted and clamping positions. Another aspect of the present invention utilizes a spring biased plunger for selectively engaging a detent in the sleeve to encourage the sleeve and arm to remain in a fully retracted position if fluid pressure is lost. A further aspect of the present invention provides various mount configurations.

38 Claims, 7 Drawing Sheets

RETRACTING POWER CLAMP

BACKGROUND AND SUMMARY OF THE INVENTION

This invention relates generally to clamps and more specifically to a retracting power clamp.

It is often desirable to forcibly clamp and hold an item in a predetermined position or location in order to perform a machining or fabrication operation on the item. In such applications, the complexity of the shape or configuration of the item being clamped often presents difficulties in clamping the item and providing access for a clamping member to engage the item. Thus, it has been found advantageous to provide clamping devices having clamping components or mechanisms that are capable of being extended either for horizontal or vertical clamping engagement of the item. It is also known to employ clamps that have gripping arms that can be retracted into the body of the clamp in order to clear the path for other operations or to temporarily unobstruct an area for moving the item between adjacent conveyed locations. One such device is disclosed in U.S. Pat. No. 5,165,670 entitled "Retracting Power Clamp" which issued to Sawdon on Nov. 24, 1992; this device weighs approximately 13 pounds.

Other conventional power clamps typically employ a piston cylinder which is separately formed and attached to an inverted L-shaped linkage housing. Such conventional linkage housings are commonly formed of flat cast or extruded side plates having a rectangular cross sectional shape. For example, DE-STA-CO Company Model No. 8005-7F clamp, which weighs approximately 12 pounds (for a 11.06 inch long by 2.36 inch thick by 5.51 inch wide clamp), has a linkage housing which significantly overhangs and is larger than the separate piston cylinder; this DE-STA-CO clamp is further believed to use at least two linkages having first ends pivotably joined to a retracting arm and having second ends pivotably joined to the linkage housing. A Tunkers GmbH clamp Model No. PKS 50 U, also has a linkage housing which significantly overhangs a separate piston cylinder; this device weighs approximately 9.9 pounds (for a 11.34 inch long by 2.36 inch thick by 4.72 inch wide clamp). U.S. Pat. No. 4,494,739 which issued to Valentine and U.S. Pat. No. 3,545,050 which issued to Blatt et al. also disclose other arrangements of clamps employing separate linkage housings and piston cylinders.

In accordance with the present invention, the preferred embodiment of a retracting power clamp includes a body having a generally cylindrical external surface. A clamping arm is movable from a retracted position to a clamping position with the arm being linearly extendable and pivotable relative to the body when moved between the retracted and clamping positions. In another aspect of the present invention, the arm is entirely located inside the body when in the retracted position and the arm is entirely located external to the body when in the clamping position. A further aspect of the present invention provides a sleeve linearly movable in the body, a piston driven rod linearly movable in said sleeve and a link which couples the arm to the driving rod while the arm is also pivotably coupled to the sleeve. In yet a further aspect of the present invention, the body is machined as a single piece including a piston chamber and a receptacle for linkages. Still another aspect of the present invention utilizes a spring biased plunger for selectively engaging a detent in the sleeve to encourage the sleeve and arm to remain in a fully retracted position if fluid pressure is lost.

The retracting power clamp of the present invention is highly advantageous over traditional clamps by utilizing a single piece body having a circular-cylindrical external shape. This allows for lower manufacturing cost. This body arrangement also promotes quicker setting up and manufacturing of the present invention clamp while also allowing for mounting adjustability to an infinite variety of linear and rotational use positions relative to a stationary manufacturing plant fixture. The clamp of the present invention is also more compact and lighter weight (approximately 8.5 pounds for a 11.73 inch long and 2.953 inch diameter clamp) than most other known retracting clamps due to the circular shape and fewer number of clamp components. Standard gripper pads, common with other clamps and grippers, can be quickly and easily attached and removed to the end of the clamp arm of the present invention. Furthermore, the present invention uses fewer linkages than many other clamps, thus reducing part and assembly costs while improving durability and part tolerance build-ups. Additional advantages and features of the present invention will become apparent from the following description and appended claims, taken in conjunction with the accompanying drawings.

Figure 1:
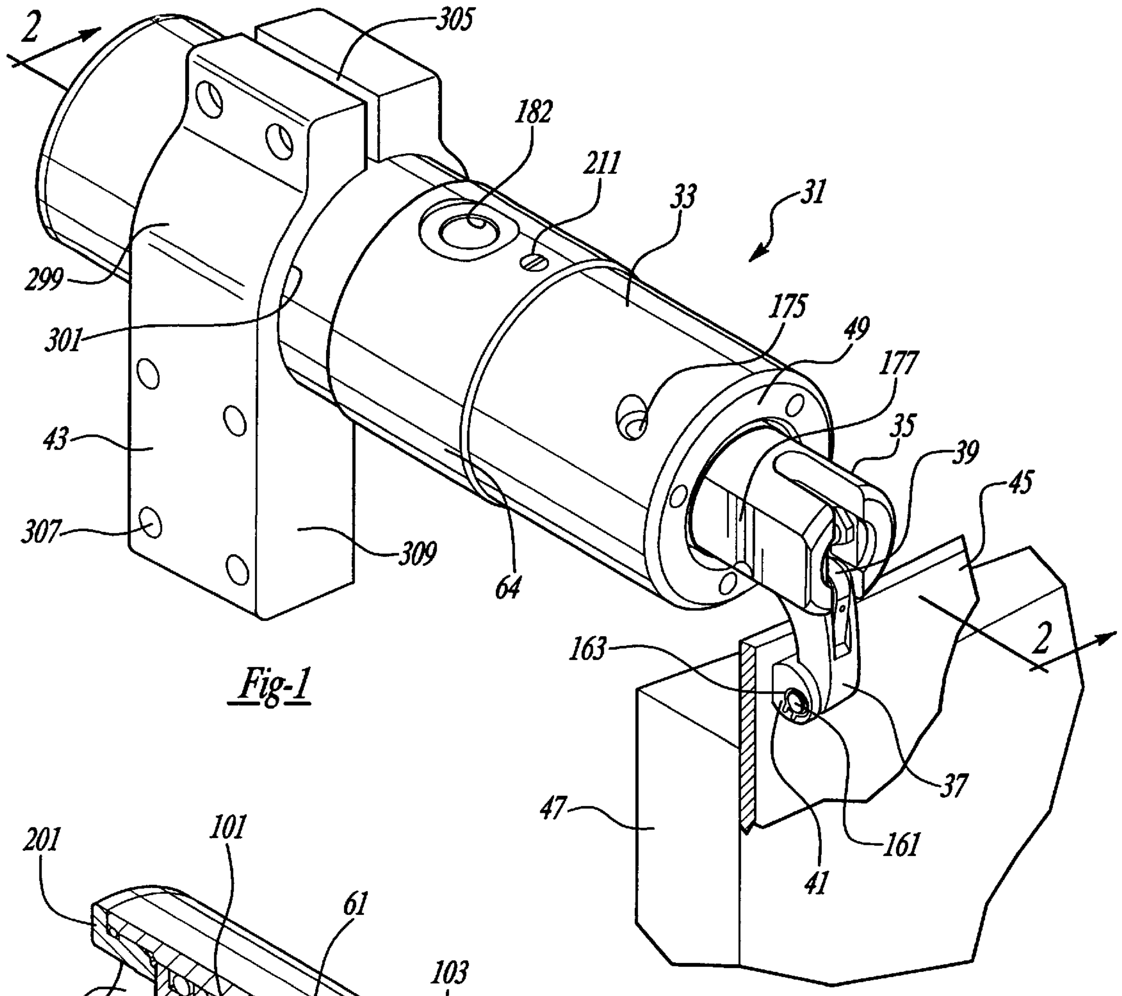
FIG. 1 is a perspective view showing the preferred embodiment of a retracting power clamp of the present invention employing a first preferred embodiment mount.
Figure 2:
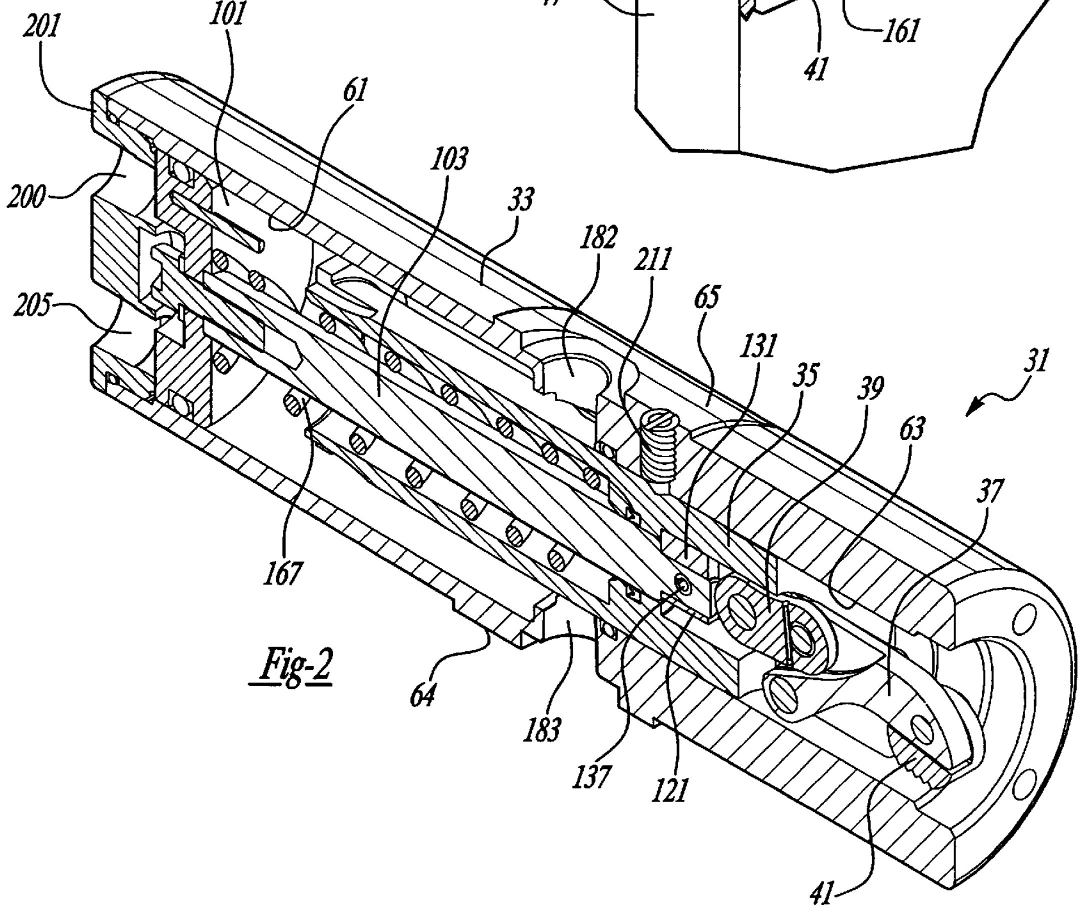
FIG. 2 is a longitudinally sectioned perspective view, taken along line 2—2 of FIG. 1, showing the preferred embodiment retracting power clamp disposed in a fully retracted position.
Figure 3:
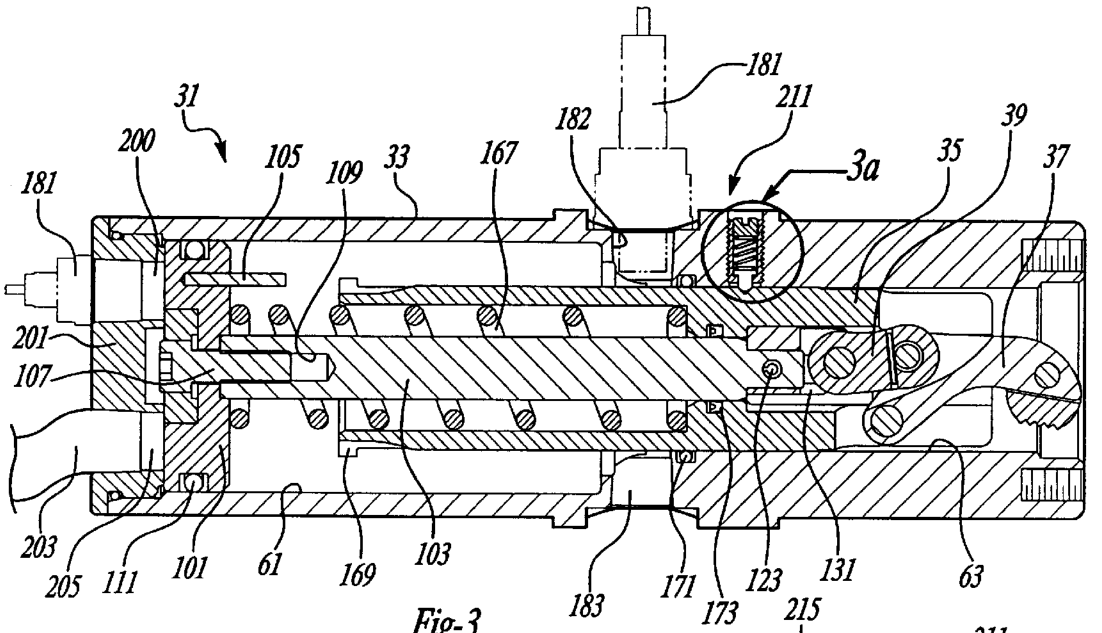
FIG. 3 is a longitudinally sectioned view, taken along line 2—2 of FIG. 1, showing the preferred embodiment retracting power clamp disposed in a fully retracted position.
Figure 4:
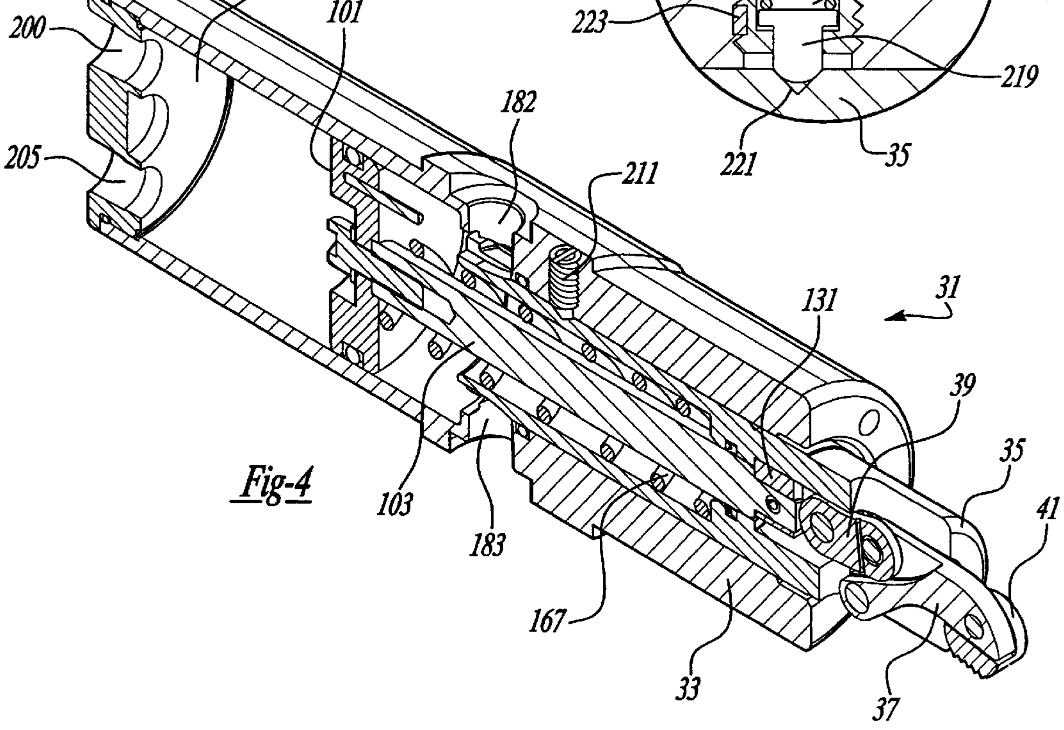
Figure 5:
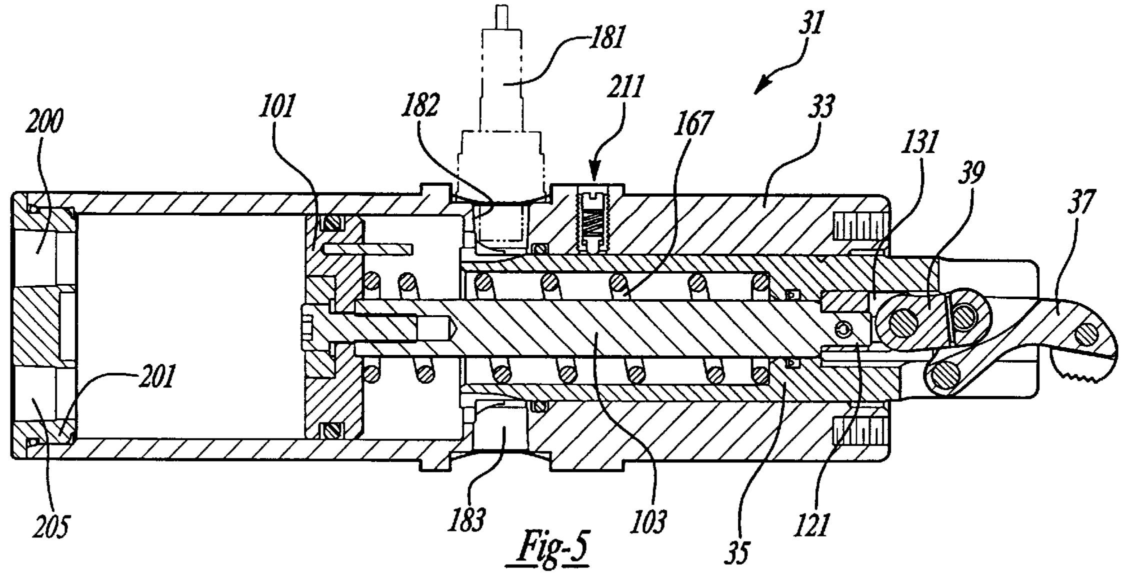
Figure 6:
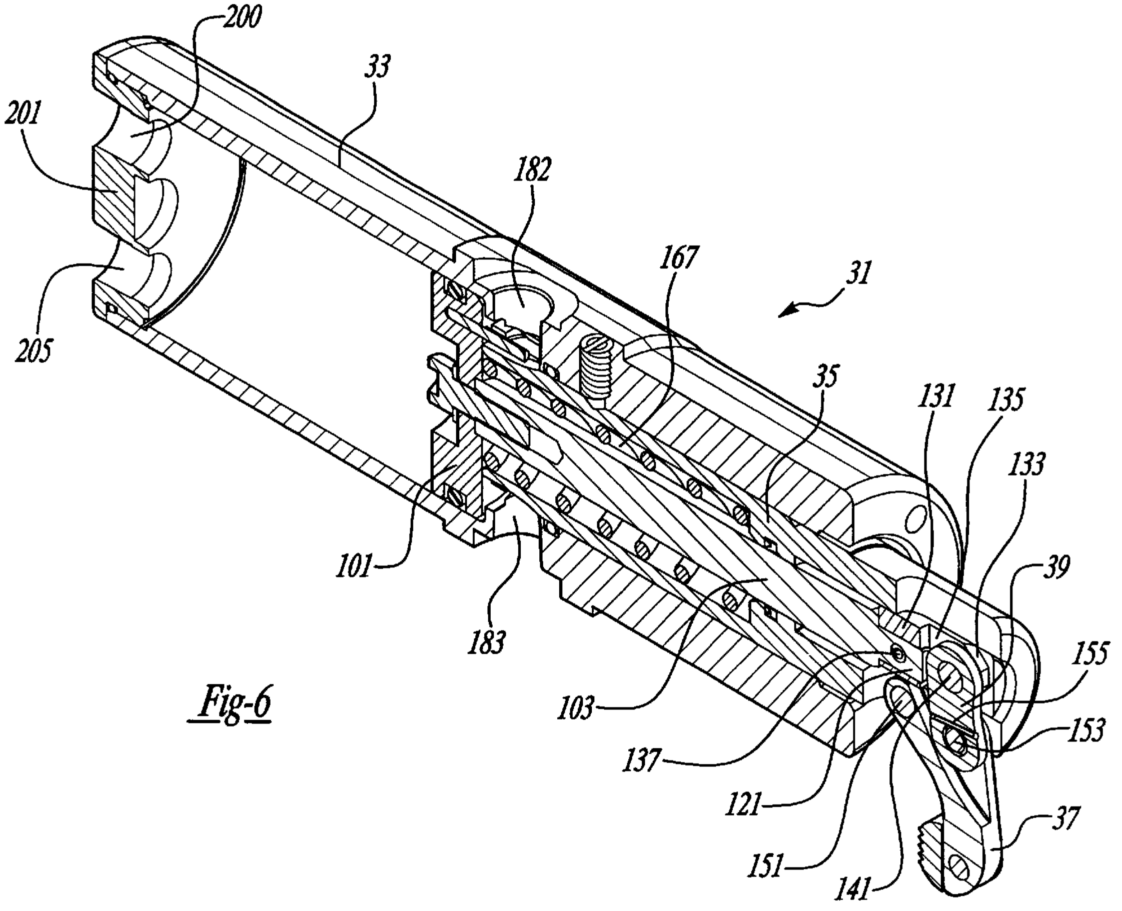
Figure 7:
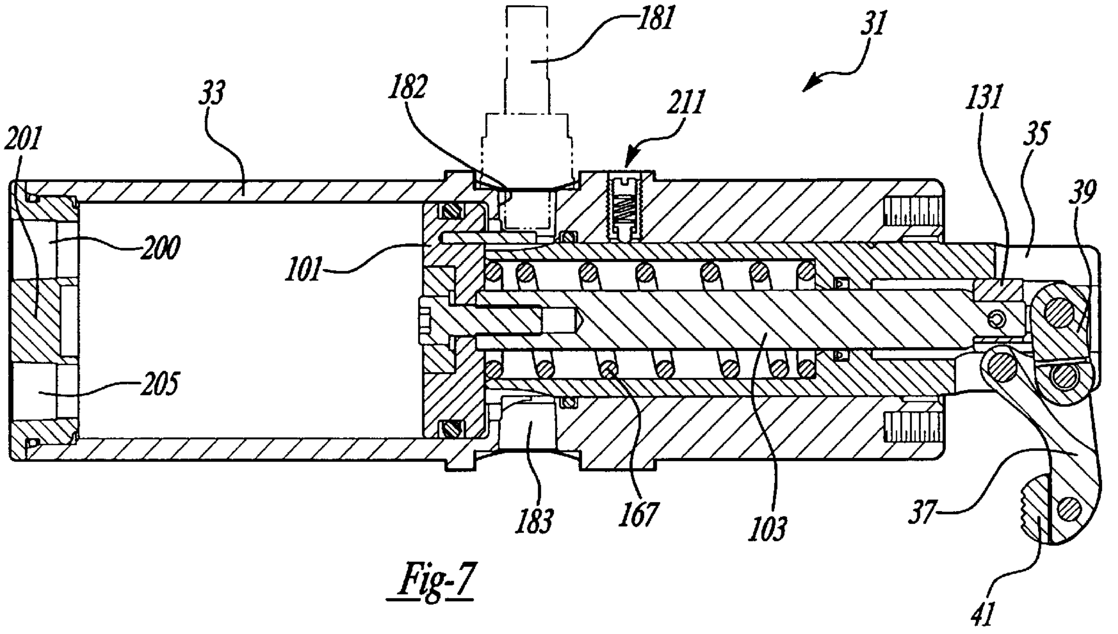
Figure 8:
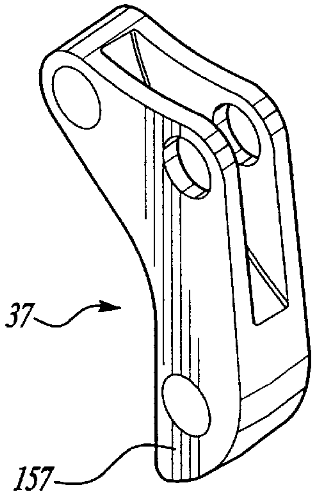
Figure 9:
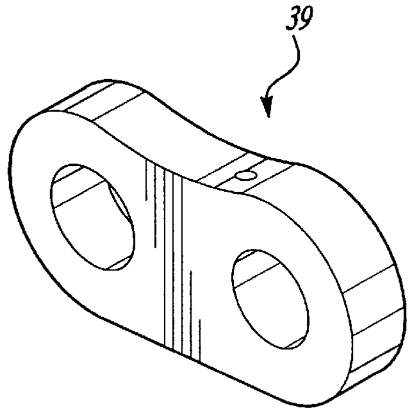
Figure 10:
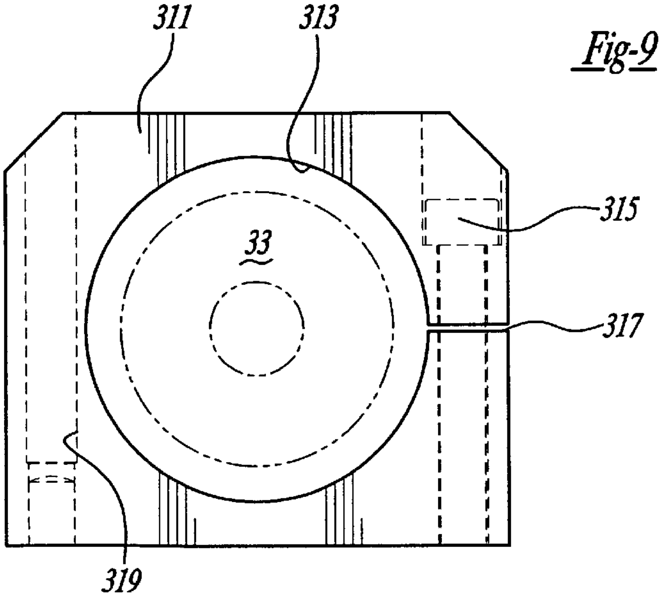
Figure 11:
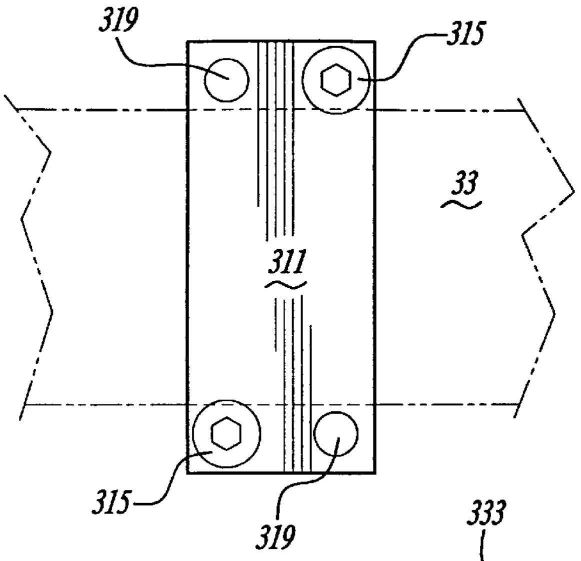
Figure 12:
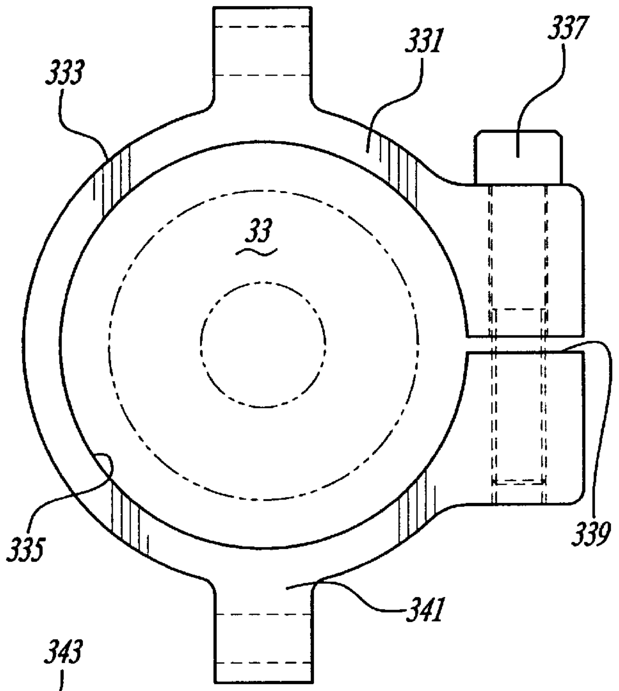
Figure 13:
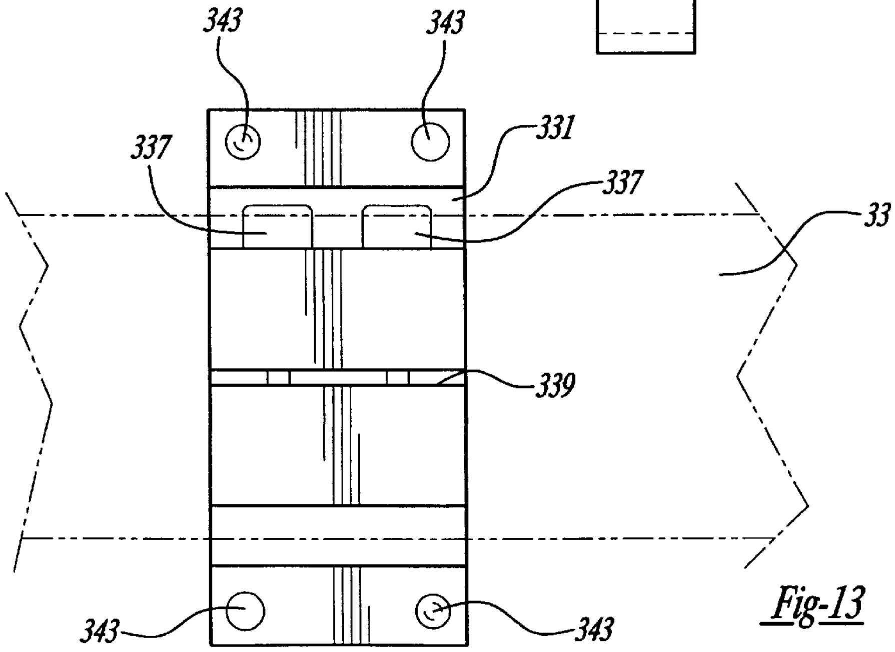
Figure 14:
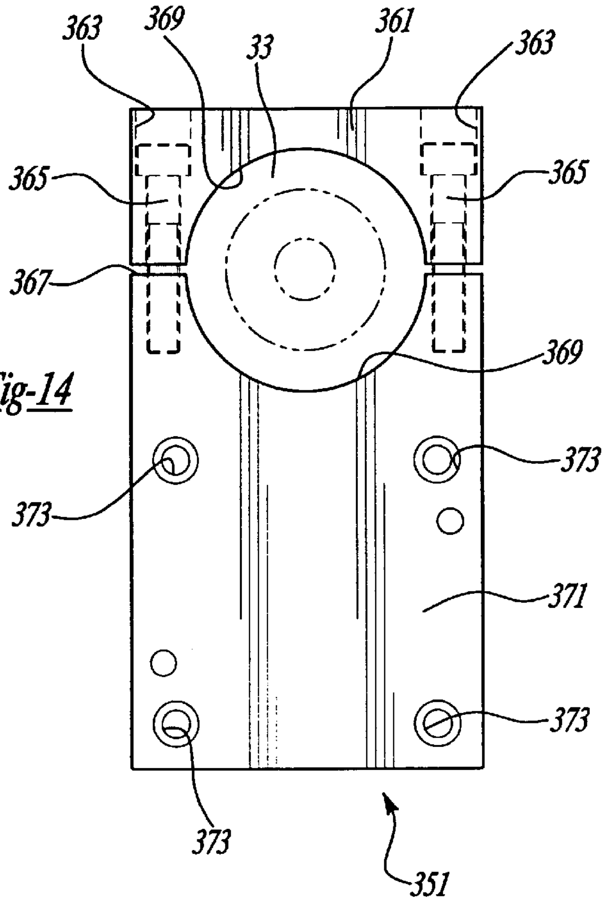
Figure 15:
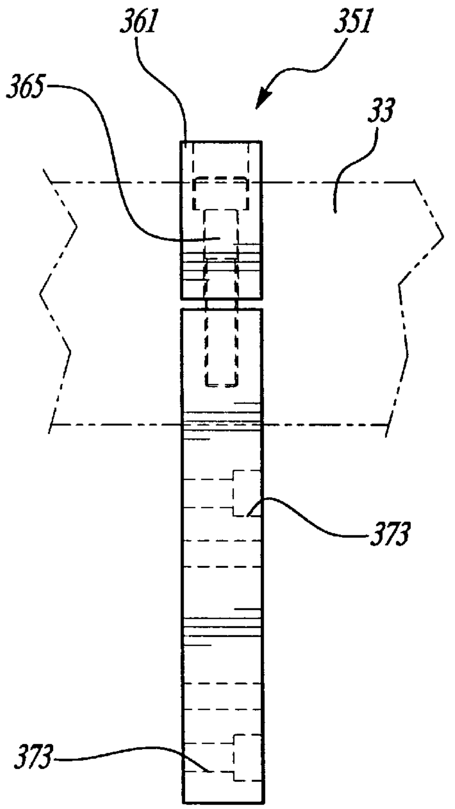
Figure 16:
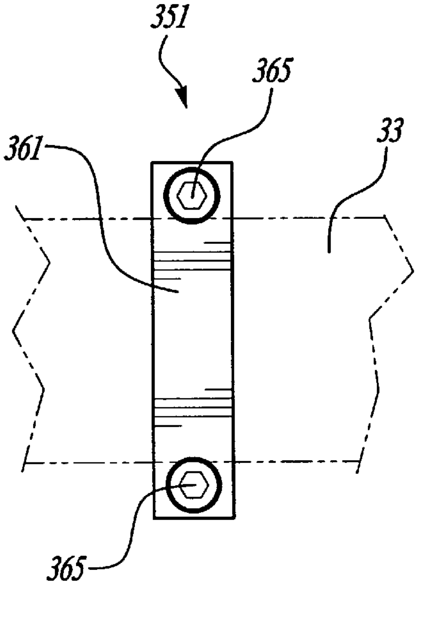
Figure 17:
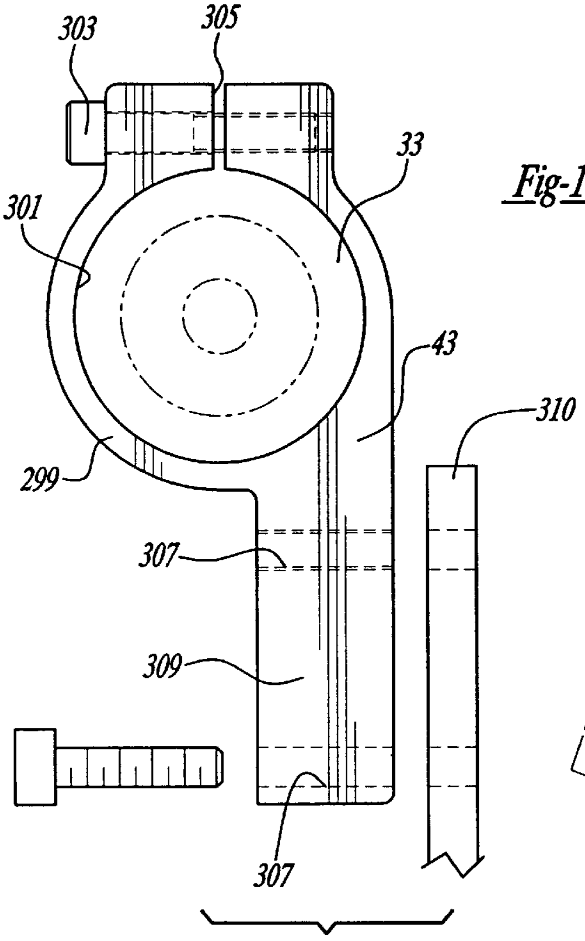
Figure 18:
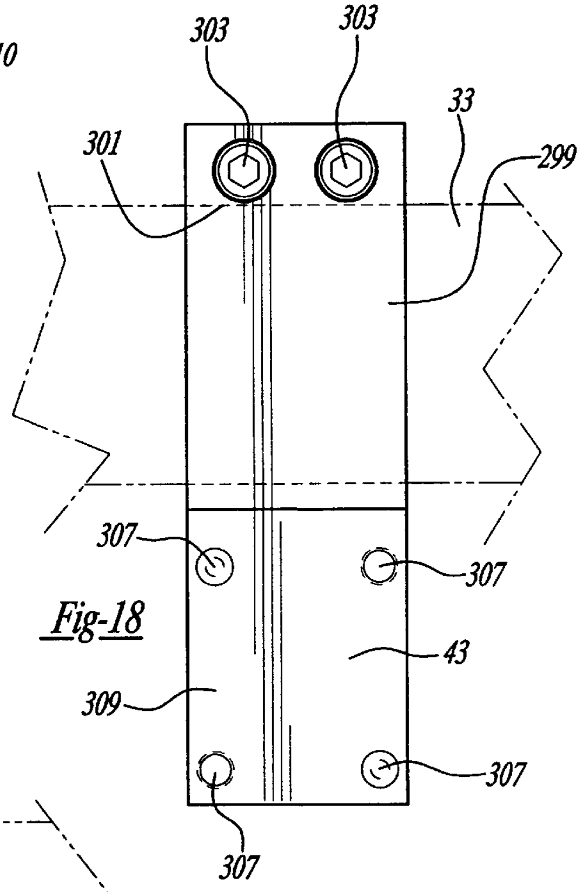
Figure 19:
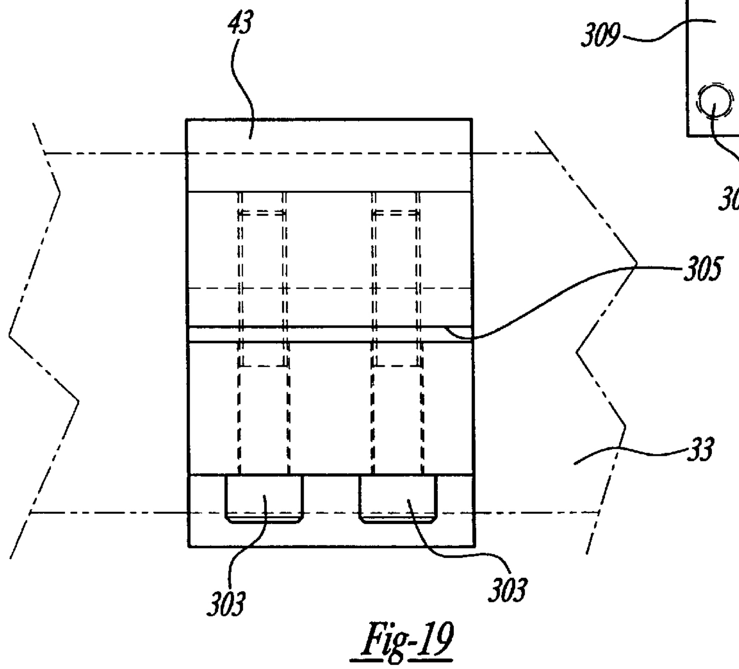

FIG. **3*a* is an enlarged sectional view, taken in circle 3*a* of FIG. 3**, showing a position maintaining device employed in the preferred embodiment retracting power clamp;

FIG. 4 is a longitudinally sectioned perspective view, similar to FIG. 2, showing the preferred embodiment retracting power clamp disposed in a fully extended position;

FIG. 5 is a longitudinally sectioned view, similar to FIG. 3, showing the preferred embodiment retracting power clamp disposed in a fully extended position;

FIG. 6 is a longitudinally sectioned perspective view, similar to FIG. 2, showing the preferred embodiment retracting power clamp in a full clamping position;

FIG. 7 is a longitudinally sectioned view, similar to FIG. 3, showing the preferred embodiment retracting power clamp disposed in a full clamping position;

FIG. 8 is a perspective view showing an arm employed in the preferred embodiment retracting power clamp;

FIG. 9 is a perspective view showing a link employed in the preferred embodiment retracting power clamp;

FIG. 10 is an end elevational view showing a second preferred embodiment mount employed with the preferred embodiment retracting power clamp;

FIG. 11 is a top elevational view showing the second preferred embodiment mount of FIG. 10 employed with the preferred embodiment retracting power clamp;

FIG. 12 is an end elevational view showing a third preferred embodiment mount employed with the preferred embodiment retracting power clamp;

FIG. 13 is a side elevational view showing the third preferred embodiment mount of FIG. 12 employed with the preferred embodiment retracting power clamp;

FIG. 14 is an end elevational view showing a fourth preferred embodiment mount employed with the preferred embodiment retracting power clamp;

FIG. 15 is a side elevational view showing the fourth preferred embodiment mount of FIG. 14 employed with the preferred embodiment retracting power clamp;

FIG. 16 is a top elevational view showing the fourth preferred embodiment mount of FIG. 14 employed with the preferred embodiment retracting power clamp;

FIG. 17 is an end elevational view showing the first preferred embodiment mount of FIG. 1 employed with the preferred embodiment retracting power clamp;

FIG. 18 is a side elevational view showing the first preferred embodiment mount of FIG. 1 employed with the preferred embodiment retracting power clamp; and FIG. 19 is a top elevational view showing the first preferred embodiment mount of FIG. 1 employed with the preferred embodiment retracting power clamp.

DETAILED DESCRIPTION OF THE PREFERRED EMBODIMENT

FIG. 1 shows the preferred embodiment of a retracting power clamp 31 having a body 33, sleeve 35, gripping arm 37, link 39, gripping pad 41 and a blade mount 43. Arm 37 is illustrated in a full gripping position whereby gripping pad 41 forcibly secures a sheet metal workpiece 45 against a work surface 47. Blade mount 43 is bolted to a static fixture but may alternately be mounted to a robotic or otherwise movable arm.

Retracting power clamp 31 is ideally suited for use in securing workpieces on a moving assembly line or on shuffling conveying type system where sleeve 35 and arm 37 can be retracted entirely within body 33 to allow clear passage of workpiece 45 immediately adjacent a first end 49 of clamp 31. After workpiece 45 has been moved to its desired clamping position, sleeve 35 and arm 37 are linearly advanced to an extended position, such as through a tight circular opening or immediately adjacent to an edge of workpiece 45, and then arm 37 is subsequently rotated to the clamping position. Hence, the retracting nature of clamp 31 is highly beneficial over non-retracting clamps, especially in a tightly packaged manufacturing environment where floor space is at a premium.

FIGS. 2 and 3 depict the clamp components disposed in a fully retracted position whereby sleeve 35 is entirely located internal in a piston chamber 61 and linkage cavity 63 of body 33 while link 39 and arm 37 are entirely located in linkage cavity 63 of body 33. Body 33 is made as a single piece integrating both piston chamber 61 and linkage cavity 63 portions. Body 33 is machined on a lathe from 6061-T651 aluminum round barstock such that an external surface 65 is entirely circular-cylindrical in shape. A cylindrical step 64 is provided on body 33 to aid as a reference dimension in determining the set up position for the mount. Piston chamber 61 and linkage cavity 63 are similarly machined on the lathe. Body 33 is then provided with a hard coat after the holes are drilled. The lathe and aperture drilling operations can occur in a single set up thereby reducing handling and machining costs.

A cylindrical piston 101, having flat front and rear faces, is bolted onto a circular-cylindrical piston rod member 103. Piston 101 is machined on a lathe from 6061-T651 aluminum. A bore is drilled in front face of piston 101 for receiving a pressfit metallic proximity shaft 105. A countersunk hole is drilled in the opposite rear face of piston 101 for receiving a bolt 107, which is also secured in a bore 109 of piston rod 103. An elastomeric O-ring 111 is provided within a circumferential groove of piston 101 for sealing against piston chamber 61.

Piston rod 103 is first machined to a single circular-cylindrical shape from 1045 chrome-plated shafting. Next, piston rod 103 is provided with a leading stepped distal end 121 by machining a circular-cylindrical external shape on a lathe. Rear chamfers are also provided on the lathe whereafter threaded hole 109 and a hole 123 are drilled.

As can best be observed in FIG. 6, a slide block 131 couples distal end 121 to link 39. Slide block 131 is machined on a lathe from 4150HT HRS to provide for a circular-cylindrical external shape and an internal passageway. A leading end of slide block is provided with upper and lower tapers. Furthermore, leading end of slide block is bifurcated about a central slot 135 for receiving a portion of link 39. A rear transverse through hole is machined in slide block for receiving a roll pin 137 which also engages the internally located distal end 121 of piston rod 103. A circular-cylindrical steel pin 141 is received in a leading transverse hole in the bifurcated leading end of slide block 131 and a first pivot hole of link 39. A pair of generally circular snap rings (not shown) secure pin 141 to slide block 131.

Referring to FIGS. 6, 8 and 9, a first pivot of gripping arm 37 is rotatably coupled to sleeve 35 by way of a steel pin 151 secured to a slotted leading end of sleeve 35 by a pair of snap rings. Another steel pin 153, having a centrally located circumferential groove, rotatably secures a second pivot of link 39 to second pivots of arm 37. A roll pin 155 is inserted into link 39 for securing pin 153. Link 39 is further received in an internal groove of arm 37 as is shown in FIG. 1. Link 39 is made by 4140 steel investment casting; the pivot holes are then drilled and reamed. A 4140HRS, black oxide coated arm 37 is machined on a milling machine for the outside contour and internal slot (but could alternately be cast and then machined) whereafter the pivot holes are drilled and reamed.

FIGS. 1 and 2 disclose one of the interchangeable gripping pads 41 which may be used. Gripping pad 41 is investment cast from 8620 CF steel, carbonized, hardened and then provided with a black oxide coating. Gripping pad 41 has a generally U-shaped front view surrounding a somewhat pointed leading end 157 (see FIG. 8) of arm 37 while gripping pad 41 also has a side view shape of approximately three quarters of a circle with multiple rows of pyramidal-shaped teeth projecting from a flat bottom surface. A steel pin 161 and a pair of generally circular snap rings 163 secure gripping pad 41 to arm 37 in a removable manner. Other elastomeric inserts, dual conical projections or the like may be provided on the bottom surface of alternate gripping pads.

FIGS. 3 and 6 show the slidable relationship of sleeve 35 within body 33 as well as the movable positioning of piston rod 103 within a longitudinally hollow passageway of sleeve 35. A helically wound compression spring 167 has a first end abutting against an internal ledge of sleeve 35 while also having a rear end abutting against front face of piston 101. Moreover, slide block 131 and a portion of link 39 are movably received within and abut against an opposite hollow section of sleeve 35. Sleeve 35 is machined on a lathe from 4150HT HRS and provided with a black oxide coating. Various transversely oriented holes are drilled therethrough. A transversely projecting flange 169 on sleeve 35 serve to abut against an inwardly extending portion of body 33 thereby limiting advancing movement of sleeve to the fully extended position shown in FIG. 6. An O-ring seal 171 is disposed between body 33 and slide 35 while a V-shaped seal 173 is disposed between slide 35 and piston rod 103. A pin 175 (see FIG. 1), held in place by snap rings, is secured in a hole of body. Pin 175 is positioned adjacent to a flat 177 (also see FIG. 1) in one side of sleeve 35 to prevent sleeve 35 from rotating relative to body 33.

A Balluff Co. (Germany) proximity sensor 181 is mounted in a transverse aperture or port 182 of body 33 opposite from a pneumatic port 183 in order to sense the advanced position of shaft 105 extending from piston 101. Similarly, a proximity sensor 181 is mounted in a threaded aperture or port 200 disposed through an aluminum end cap 201 for sensing the fully retracted position of piston 101. A pneumatic fluid tube 203 is coupled to another threaded port 205 of end cap 201. Ports 200 and 205 are longitudinally oriented parallel to each other and parallel to the advancing and retracting directions of piston 101. This provides superior flexibility of placement and protection of sensor 181. Proximity sensors 181 may be switched with the adjacent ports if desired. Alternately, localized flats and tapped holes are provided on the external surface of body 33 immediately adjacent ports 182 and 183 for mounting of a Cylindicator sensing switch which can be obtained from Namco Co.

Figure 3A:
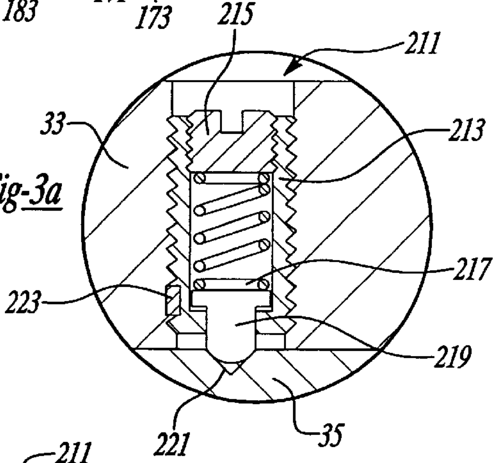

Referring to FIG. 3*a*, a position maintaining device 211 has a threaded casing 213, a slotted cap 215, a compression spring 217 and a rounded plunger 219. Position maintaining device 211 is mounted in a body opening such that spring 217 inwardly biases plunger 219 against the external surface of sleeve 35. Thus, plunger 219 will engage a detent groove 221 machined in sleeve 35 when sleeve 35 is in a predetermined fully retracted position. This serves to at least temporarily maintain the weight of arm 37, link 39 and sleeve 35 inside of body 33 even if pneumatic fluid pressure is lost. When advancing fluid pressure is applied against piston 101, the spring force of position maintaining device 211 will be overcome such that arm 37, link 39 and sleeve 35 will advance. A nylon locking element 223 is contained within a space in the threads of casing 213 to aid in the fastening and retention of position maintaining device 211 relative to body 33. It is alternately envisioned that a spring biased plunger may be disposed in sleeve while a detent groove may be disposed in the body. A Vlier Co. standard plunger has been found desirable for this use.

The operation of retracting power clamp 31 is as follows. Pneumatic pressure is applied to move piston 101 and the attached piston rod is a first linearly longitudinal direction, from the fully retracted positions of FIGS. 2 and 3 to the full linearly extended positions of FIGS. 4 and 5. Thus, spring 167 serves to advance slide in concert with piston 101 while slide block 131, link 39 and arm 37 are also linearly advanced. Distal end 121 of piston rod 103 and a trailing section of link 39 are still located internal to body 33 even in this fully extended position. Thereafter, further fluid pressure causes piston 101 to continue advancing. However, sleeve 35 is prevented from further advancing whereby piston rod pushes link 39, which in turn rotates arm 37 relative to sleeve 35. Arm 37 is thereby rotated from the fully extended position shown in FIGS. 4 and 5 to a full clamping position as shown in FIGS. 1, 6 and 7. In the full clamping position, arm 37 is toggled five degrees before a center linkage position. Opposite pneumatic pressure against piston 101 causes reverse movement of the components.

The circular-cylindrical external surface of body 33 is highly advantageous by interfacing with various mount configurations in infinite angular and longitudinal adjustment positions. For example, FIGS. 1 and 17–19 disclose a generally rounded Y-shaped blade mount 43 having a clevis segment 299 circular internal aperture 301 for receiving body 33. Bolts 303 bridge across a slotted opening 305 for clamping mount 43 in its desired angular and linear orientation relative to body 33. Bolts can be inserted through openings 307 for securing the offset blade segment 309 to a fixture 310.

FIGS. 10 and 11 show another embodiment mount 311 having a generally square shape with a circular aperture 313 surrounding body 33. Bolts 315 bridge across a slot 317 for clamping mount to body 33. Countersunk holes 319 are provided for receiving additional bolts thereby securing mount 311 to a fixture.

FIGS. 12 and 13 disclose still another embodiment mount 331 having a somewhat round external shape 333 concentric about body 33. A circular internal surface 335 of mount 331 clampably engages about the external surface of body 33 and is secured in position by bolts 337 bridging across the slot 339. A pair of opposing flanges 341 receive bolts 343 for mounting mount 331 to a fixture.

Yet another embodiment of a mount is shown in FIGS. 14–16. In this exemplary embodiment, a two-piece mount 351 includes a top half 361 having two countersunk bores 363 for receiving bolts 365. Bolts 365 bridge across slots 367 located on opposite sides of semi-circular internal surfaces 369. Tightening of bolts 365 causes top half 361 to clamp body 33 against semi-circular surface 369 of bottom half 371. Bottom half 371 has a plurality of countersunk openings 373 for receiving bolts used in securing the mount to the fixture.

Each disclosed mount embodiment can be longitudinally moved along almost any portion of body 33, including surrounding the piston chamber or around the linkage cavity, by simply unscrewing the bolts and sliding the clamp relative to the mount. Similarly, unscrewing of the bolts allows the clamp to be rotated to an infinite number of angular or rotational positions relative to the mount whereafter the bolts can be cinched down to resecure the clamp in its final desired position.

While the preferred embodiment clamp and various embodiment mounts have been disclosed herein, it should be appreciated that many other clamp and mount constructions may be employed without departing from the present invention. For example, the arm, link, slide block and sleeve may have many other shapes and coupling arrangements as long as they provide the presently disclosed linear and rotational retracting and extending functions. It should also be appreciated that hydraulic rather than pneumatic fluid may be used to pressure the piston. Various materials have been disclosed in an exemplary fashion, however, other materials may of course be employed. It is intended by the following claims to cover these and any other departures from the disclosed embodiments which fall within the true spirit of this invention.

The invention claimed is:

1. A clamp comprising:

a body having a substantially cylindrical external surface;

a clamping arm movable from a retracted position to a clamping position, said arm being linearly extendable and pivotable relative to said body when moved between said retracted and clamping positions;

a majority of said arm located internally in said body when said arm is in said retracted position;

said majority of said arm located externally to said body when said arm is in said clamping position; and a position maintaining device serving to substantially maintain said arm in a predetermined position if desired fluid pressure is not present, sufficient fluid pressure being suitable to overcome forces of said position maintaining device.

2. The clamp of claim 1 further comprising:

an element linearly movable in said body;

said arm having a first pivot coupled to said element.

3. The clamp of claim 2 further comprising:

a driving member linearly movable in said body;

said arm having a second pivot; and a link having a first pivot movably coupled to said driving member and a second pivot movably coupled to said second pivot of said arm;

movement of said driving member relative to said element causing said arm to rotate relative to said element and said body.

4. The clamp of claim 3 further comprising:

a fluid powered piston coupled to said driving member;

said element and said driving member being linearly movable in concert when said arm is moved in a substantially linear manner between said retracted position and an extended position, at least the majority of said arm projecting externally from said body when said arm is in said extended position; and said element being substantially maintained in an advanced position while said piston causes said driving member to linearly move relative to said element thereby causing said arm to rotate between said extended position and said clamping position.

5. The clamp of claim 3 further comprising a spring wherein:

said element is a hollow sleeve;

said driving member is a substantially circular-cylindrical rod located internal to said sleeve; and a spring linearly biases said sleeve toward said arm.

6. The clamp of claim 1 wherein:

said arm is first linearly movable from said retracted position to a linearly extended position, and then said arm is subsequently rotated from said fully extended position to said clamping position; and at least a majority of said arm is located externally to said body when in said fully extended position.

7. The clamp of claim 6 further comprising:

a linearly movable rod having a distal end located opposite said piston;

a link coupling said rod to said arm;

a piston attaching to and always moving with said rod;

said arm being entirely located inside said body when in said retracted position and said arm being entirely located externally to said body when in said clamping position; and a portion of said link and said distal end of said rod located inside said body when said arm is in said fully extended position.

8. The clamp of claim 1 further comprising:

said body having a piston chamber end;

an end cap attached to said piston chamber end;

a fluid powered piston movably located internal in said substantially cylindrical body;

a sensor located in a first hole in said end cap; and a fluid transporting tube coupled to a second hole in said end cap;

said sleeve advancing and retracting through an aperture in an end of said body substantially opposite said end cap.

9. The clamp of claim 1 further comprising a gripping pad removably attached to an end of said arm.

10. The clamp of claim 1 further comprising:

a piston located in said body linearly movable in advancing and retracting directions, said piston operably driving said arm between said arm positions; and a mount removably attachable to said substantially cylindrical external surface of said body, said mount being linearly movable along an axis of said body substantially parallel to said advancing and retracting directions of said piston, said mount being adjustably movable to one of an infinite number of radial positions around said substantially cylindrical external surface of said body.

11. A fluid powered clamp comprising:

a body;

a linearly moving element located at least partially in said body;

a clamping member movably coupled to said element;

a detent formation located on one of said body and said linearly moving element; and a biased plunger selectively engaging said detent formation when said element is in a predetermined location relative to said body thereby encouraging said element and said clamping member to remain in said predetermined position relative to said body upon loss of driving force.

12. The powered clamp of claim 11 wherein said predetermined position is a fully retracted position with a majority of said clamping member being linearly retracted into said body.

13. The clamp of claim 12 wherein said clamping member is first linearly movable from said retracted position to a linearly extended position, and then said clamping member is subsequently rotated from said extended position to a clamping position, a majority of said clamping member is located external to said body when in said extended position.

14. The powered clamp of claim 11 further comprising a spring biasing said plunger internal to said body, said spring being located in an opening in said body accessible from a substantially circular-cylindrical external surface of said body.

15. The powered clamp of claim 11 further comprising:

a first pivot coupling said clamping member to said element;

a driving member located in said body; and a link pivotably coupling said clamping member to said driving member;

said driving member being movable even if said element is stationary.

16. The powered clamp of claim 11 further comprising a pneumatically actuated piston located in said body operably moving said element and said clamping member.

17. The powered clamp of claim 11 further comprising a spring longitudinally biasing said element away from an end of said body.

18. The powered clamp of claim 11 wherein a majority of said clamping member is retractable inside said body.

19. The powered clamp of claim 11 wherein a majority of said body has a cylindrical external surface.

20. A clamp comprising:

a body;

a clamping arm coupled to said body, said arm being movable from a retracted position to a clamping position, said arm being linearly extendable and pivotable relative to said body when moved between said retracted and clamping positions;

a majority of said arm located internally in said body when said arm is in said retracted position;

said majority of said arm being located externally to said body when said arm is in said clamping position; and a position maintaining device serving to substantially maintain said arm inside said body if desired fluid pressure is not present, sufficient fluid pressure being suitable to overcome forces of said position maintaining device.

21. The clamp of claim 20 further comprising:

an element linearly movable in said body;

said arm having a first pivot coupled to said element.

22. The clamp of claim 21 further comprising:

a driving member linearly movable in said body;

said arm having a second pivot; and a link having a first pivot movably coupled to said driving member and a second pivot movably coupled to said second pivot of said arm;

movement of said driving member relative to said element causing said arm to rotate relative to said element and said body.

23. The clamp of claim 22 further comprising:

a fluid powered piston coupled to said driving member;

said element and said driving member being linearly movable in concert when said arm is moved in a substantially linear manner between said retracted position and an extended position, at least the majority of said arm projecting externally from said body when said arm is in said extended position; and said element being substantially maintained in an advanced position while said piston causes said driving member to linearly move relative to said element thereby causing said arm to rotate between said extended position and said clamping position.

24. The clamp of claim 22 further comprising a spring wherein:

said element is a hollow sleeve;

said driving member is a substantially circular-cylindrical rod located internal to said sleeve; and a spring linearly biases said sleeve toward said arm.

25. The clamp of claim 20 wherein:

said arm is first linearly movable from said retracted position to a linearly extended position, and then said arm is subsequently rotated from said fully extended position to said clamping position; and at least a majority of said arm is located externally to said body when in said fully extended position.

26. The clamp of claim 25 further comprising:

a piston;

a linearly movable rod attached to and always movable with said piston, said rod having a distal end located opposite said piston;

a link coupling said rod to said arm;

said arm being entirely located inside said body when in said retracted position and said arm being entirely located externally to said body when in said clamping position; and a portion of said link and said distal end of said rod located inside said body when said arm is in said fully extended position.

27. The clamp of claim 20 wherein the said position maintaining device includes a detent depression.

28. The clamp of claim 27 wherein said detent depression is movable inside said body.

29. The clamp of claim 20 wherein said position maintaining device includes a spring biased member.

30. The clamp of claim 29 wherein said spring biased member is attached to said body.

31. The clamp of claim 20 further comprising:

said body having a piston chamber end;

an end cap attached to said piston chamber end;

a fluid powered piston movably located internal in said substantially cylindrical body;

a sensor located in a first hole in said end cap;

a fluid transporting tube coupled to a second hole in said end cap; and a sleeve coupled to said arm operably advancing and retracting through an aperture in an end of said body substantially opposite said end cap.

32. The clamp of claim 20 further comprising:

a piston located in said body being linearly movable in advancing and retracting directions, said piston operably driving said arm between said arm positions; and a mount removably attachable to said substantially cylindrical external surface of said body, said mount being linearly movable along an axis of said body substantially parallel to said advancing and retracting directions of said piston, said mount being adjustably movable to one of an infinite number of radial positions around said substantially cylindrical external surface of said body.

33. A clamp assembly comprising:

a clamp body having a substantially cylindrical external surface coaxial with an elongated centerline;

a clamping arm coupled to and movable relative to said body;

a curved substantially Y-shaped mount having a clevis segment with a substantially cylindrical internal edge adjustably securable around said external surface of said body, a through-slot located in a periphery of said clevis segment, said mount further having a blade segment extending from said clevis segment;

said mount being angularly and linearly movable around and along said body of said clamp until secured; and a position maintaining device assisting to maintain said arm in a desired position relative to said body if desired fluid pressure is not present, desired fluid pressure being suitable to overcome said position maintaining device.

34. The clamp assembly of claim 33 further comprising a threaded fastener serving to engage said clevis segment around said body, a piston movable inside said body and internal to said clevis segment.

35. The clamp assembly of claim 34 wherein said threaded fastener is located on a side of said clevis segment substantially opposite said blade segment.

36. The clamp assembly of claim 33 wherein said blade segment has a pair of substantially flat faces, fastener receivable holes located in said blade segment and being accessible from said faces, and said holes having elongated axes being substantially perpendicular to said centerline of said body.

37. The clamp assembly of claim 33 further comprising a fixture disengagably secured to an external surface of said blade segment.

38. The clamp assembly of claim 33 wherein at least a majority of said blade segment is offset to one side of a plane extending through said centerline of said body and said through-slot.

* * * * *

UNITED STATES PATENT AND TRADEMARK OFFICE

CERTIFICATE OF CORRECTION

PATENT NO. : 6,059,277
DATED : May 9, 2000
INVENTOR(S) : Edwin G. Sawdon et al

It is certified that error appears in the above-identified patent and that said Letters Patent is hereby corrected as shown below:

Column 3, line 33, "shuffling" should be -- shuttling --.

Column 5, line 6, after "body" insert -- 33 --.

Column 5, line 48, "is" should be -- in --.

Signed and Sealed this

Tenth Day of April, 2001

Attest:

Nicholas P. Godici

NICHOLAS P. GODICI

*Attesting Officer* *Acting Director of the United States Patent and Trademark Office*